United States Patent [19]

Hood

[11] 4,192,745
[45] Mar. 11, 1980

[54] RECLAMATION OF CEMENT SLURRY

[75] Inventor: Maxwell G. Hood, Brookvale, Australia

[73] Assignee: Fowlerex Pty. Limited, Brookvale, Australia

[21] Appl. No.: 954,287

[22] Filed: Oct. 24, 1978

[30] Foreign Application Priority Data

Oct. 24, 1977 [AU] Australia ............... PD2163

[51] Int. Cl.² ............................................. B01D 21/10
[52] U.S. Cl. ..................................... 210/66; 106/100; 210/83; 210/523
[58] Field of Search .............. 106/100, 103; 210/83, 210/523, 532 R, 66; 209/2, 10, 17

[56] References Cited
U.S. PATENT DOCUMENTS

| | | | |
|---|---|---|---|
| 2,919,808 | 1/1960 | Hilkemeier | 210/523 |
| 3,278,022 | 10/1966 | Moeschler | 209/17 X |
| 3,596,759 | 8/1971 | King et al. | 209/2 |
| 3,962,086 | 6/1976 | Rossi | 210/523 X |
| 3,997,434 | 12/1976 | Macauley, Jr. | 209/10 |

Primary Examiner—William A. Cuchlinski, Jr.
Attorney, Agent, or Firm—Frank S. Vaden, III

[57] ABSTRACT

The invention relates to the re-utilization of cement slurry previously regarded as waste. The method involves separating water from the slurry so as to concentrate it, agitating the concentrated slurry so as to keep it in uniform disperson and disposing of the concentrate by mixing it in controlled proportion with fresh concrete. Apparatus is described which concentrates cement slurry and stores it as a suspension of suitably uniform density for disposal in the above manner.

9 Claims, 5 Drawing Figures

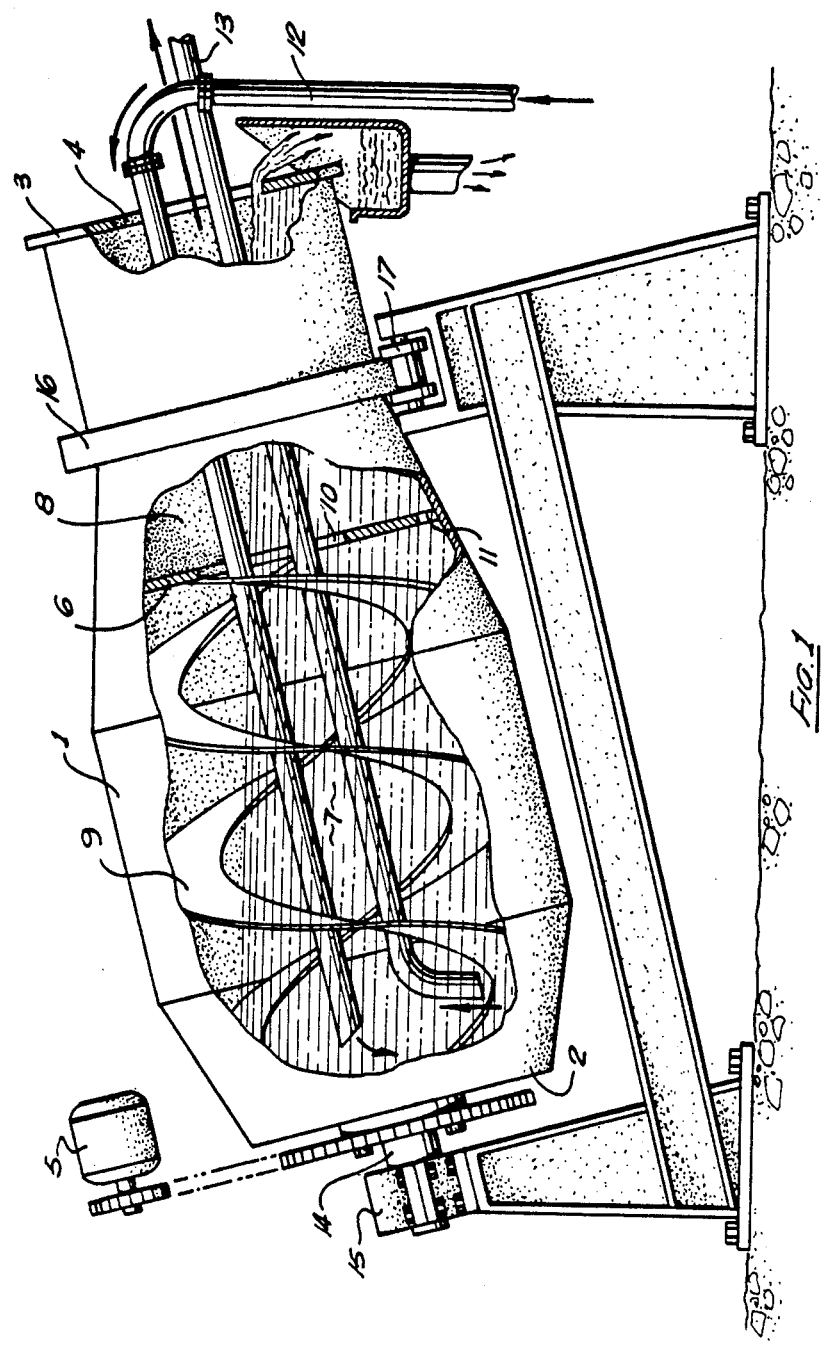

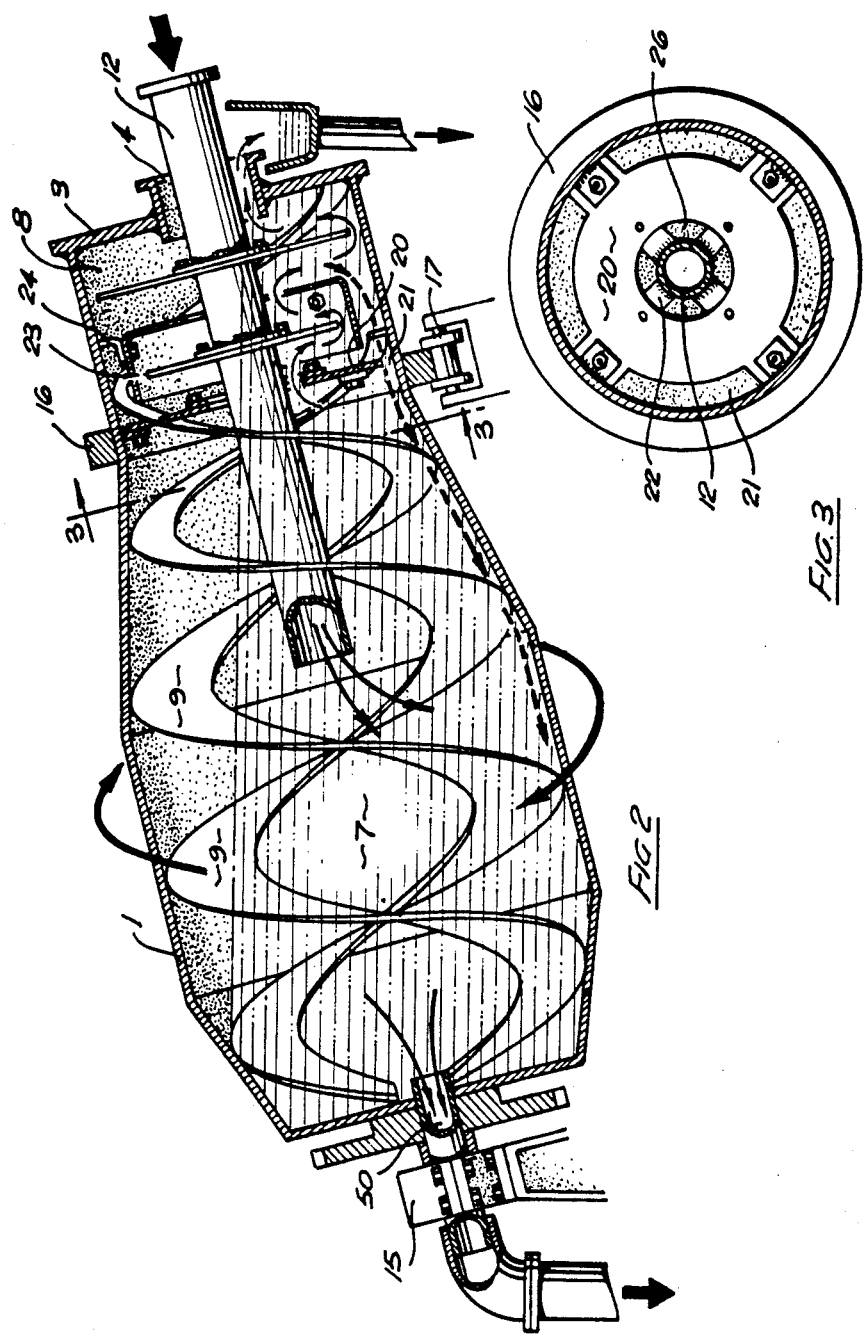

RECLAMATION OF CEMENT SLURRY

BACKGROUND OF THE INVENTION

The invention relates to the re-utilization of cement slurry at a concrete mixing plant. Cement slurry previously has been regarded solely as waste. Cement slurry is the residual component obtained during the reclamation of sand and aggregate from unset concrete and is usually left to settle a sludgy mass in settling pits at the plant.

Hitherto it has been necessary to have a sludge gulper and road tanker empty the pit and cart the sludge away from time to time, usually to some remote tip because of the paucity of disposal sites able to accept such an undesirable material. Thus the cement slurry has not only been waste material but expensive to dispose of.

SUMMARY OF THE INVENTION

An object of the present invention is to eliminate the need for the disposal of slurry waste in the manner described above.

The present invention provides a machine which concentrates the slurry and stores the concentrated slurry as a suspension of more or less consistent density throughout so enabling the concentrated slurry to be remixed into fresh concrete and preventing the settling and build up of sludge which otherwise occurs in the pits. Thus the machine has the ability to accept slurry from settling pits or aggregate reclamation plant, to separate the cement from most of the water, to store the separated material and to allow relatively clean water to flow back into the pits.

Both the concentrated slurry and the water may be reused in fresh concrete.

BRIEF DESCRIPTION OF THE DRAWINGS

Two embodiments of the invention will now be described with reference to the accompanying drawings.

FIG. 1 shows in side elevation a first embodiment according to the invention.

FIG. 2 shows in side elevation a second embodiment according to the invention.

FIG. 3 shows a cross-section of the embodiment of FIG. 2 taken on line 3—3.

DETAILED DESCRIPTION

Figure 4:
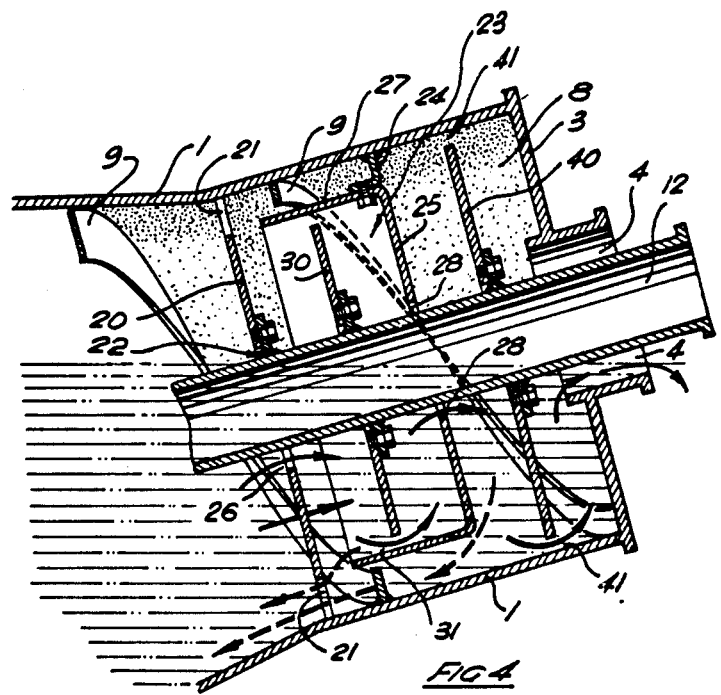
FIG. 4 shows in more detail a cross-section of part of the embodiment of FIG. 2.

FIG. 1 illustrates an apparatus comprising an inclined drum 1 with a closed lower end 2. In this embodiment the upper end of drum 1 is closed by an end plate 3 having an aperture 4 through its centre. Motor means 5 rotate drum 1 about its axis. Drum 1 comprises a bottom part of frustro-conical shape (diverging upwardly) and an intermediate part of cylindrical shape and an upper part comprising a further frustro-conical shape (converging upwardly) and a cylindrical section. A perforated baffle plate 6 substantially divides drum 1 into a lower mixing section 7 and an upper clarifying section 8.

Archimedean screw flight blades 9 are fixed to the inner wall of the lower mixing section 7. Preferably at least two such screw blades 9 are provided. The helix angle of the blades 9 may be small but the blades are nevertheless such as to urge material at or near the wall of lower section 7 downwardly as the drum rotates. The lower mixing section 7 and upper clarifying section 8 communicate through perforations in plate 6. For preference perforated baffle plate 6 comprises a circular plate extending diametrically across the drum, preferably in the upper frustro-conical section. Baffle plate 6 has a hole 10 through its centre and has perforations 11 at its periphery. There may be additional baffle plates of similar configuration but smaller diameter in the upper conical section if desired.

In the presently described embodiment, the means of delivery of slurry from a slurry pit into the lower mixing section 7, and the means for withdrawal of concentrated slurry from the lower mixing section for delivery to a batch plant comprise appropriate external pumps (not shown in FIG. 1) and a pipe system including a dilute slurry infeed pipe 12 and a concentrated slurry withdrawal pipe 13 which, when within the drum, extend through the opening 4 of upper end plate 3 and through hole 10 in baffle 6 and into lower mixing section 7. In other embodiments in flow pipe 12 may be concentric with outflow pipe 13 and in this event, pipe 12 is preferably the inner pipe and projects further into drum 1 than does pipe 13.

In the present embodiment, the water outflow means consist in opening 4 which permits water to overflow therethrough when liuid in the drum reaches a sufficient level.

For preference drum 1 is mounted at its lower end on an axle 14 and bearings 15 and the upper end is supported by a track ring 16 on steel rollers 17.

In use, slurry is first pumped from a slurry pit via infeed pipe 12 to the lower compartment 7 of drum 1. Alternatively, the slurry may be fed to the apparatus by gravity depending on site conditions or direct from another apparatus producing cement slurry as a biproduct of the reclamation of aggregate and/or sand from concrete.

Drum 1 is rotated at approximately 3 r.p.m. in one direction agitating the slurry. As the apparatus fills with slurry the cement solids settle and are urged by blades 9 towards the bottom of drum 1. Once a slurry level is established at which water overflows through opening 4, a circulation is established within the drum whereby the slurry tends to circulate from the lower mixing section 7 through the central hole 10 of baffle 6 into clarifying section 8. Material in clarifying section 8 is not subjected to the same degree of agitation as material in mixing section 7 and the higher density fluid in the vicinity of the drum wall is caused to re-circulate through peripheral holes 11 of baffle 6 into the lower mixing chamber 7 by the direction of circulatory action of spiral blades 9. In addition, cement solids settling against the drum wall of clarifying section 8 drain back into the lower compartment through performations 11 of baffle 6.

A second embodiment is shown in elevation in FIG. 2. In FIG. 2 the same numerals are used to indicate parts, where appropriate, which correspond to parts of similar function to those of the first described embodiment.

The embodiment shown in FIG. 2 differs from that of FIG. 1 in the following respects. Drum 1 is similar in shape to that of the first embodiment. In this embodiment, dilute slurry delivery means comprise a pipe 12, typically of 6 to 8 inches in diameter, extending from outside the apparatus through opening 4 of upper end plate 3 in the direction of the drum axis towards the lower end of drum 1. Pipe 12 is mounted for rotation by means typified by brackets 22 in FIGS. 3 and 4. Drum 1 is divided into a lower mixing section 7 and an upper clarifying section 8 by baffle 20 which is of circular shape, and is located near the lower end of the uppermost cylindrical section of drum 1. Baffle plate 20 has a diameter slightly less than the diameter of the upper cylindrical section of drum 1. As is more clearly visible in FIGS. 3 and 4 there is thus a clearance space 21 between the edge of baffle plate 20 and the interior of drum wall 1. In addition, baffle 20 has a hole through its centre of larger diameter than the diameter of pipe 12 leaving a clearance space 26. Pipe 12 is fixedly mounted by brackets 22 to baffle 20.

Between baffle 20 and end plate 3, a canister indicated generally at 23 is fixedly mounted on drum 1 by means of brackets 24. Canister 23 has an upper end 25, cylindrical side walls 27 and is open at its lower end. The upper end wall 25 of the canister 23 also has a hole through its centre of larger diameter than that of the pipe thereby providing a space 28 between the pipe and canister end wall 25. The lower edge of canister cylindrical side walls 27 is spaced slightly apart from baffle 20.

Circular baffle 30 is mounted on pipe 12 within the canister between baffle 20 and canister end wall 25. Baffle 30 has a sealing joint with pipe 12 and is of smaller diameter than canister 23 so that there is a space 31 between the edge of baffle 30 and a canister side wall 27.

In addition a circular baffle 40 is mounted on pipe 12 between canister end wall 25 and drum end wall 3 and has a sealing fits with pipe 12. Baffle 40 is of slightly smaller diameter than the cylindrical section of drum 1 so that there is a clearance space 41 between the edge of baffle 40 and the wall of drum 1.

In the presently described embodiment, the Archimedean flight blades 9 commence near the bottom of drum 1 and continue into the upper cylindrical section having a clearance between blade 9 and canister side wall 27. Means for withdrawing concentrated slurry comprise a hollow axle 50 mounted rotatably by bearings 15. Drum 1 is rotatable by means not shown in FIG. 2.

In operation, dilute cement slurry is deposited in the lower section of drum 1 in the manner described for the first embodiment. When the fluid level reaches the level of opening 4, water tends to overflow. The action of spiral blades 9 tends to urge cement solids settling in lower mixing chamber 7 towards the lower end of drum 1. A circulation pattern is established in which, with reference to solid flow direction lines in FIG. 4 outflowing fluid first passes through aperture 26 between baffle 20 and pipe 12, then through aperture 31 between baffle 30 and canister side wall 27, then through aperture 28 between pipe 12 and canister end wall 25, then through aperture 41 between baffle 40 and drum 1, to overflow at aperture 4 in end end wall 3. The denser fluid near the drum wall between the canister and the upper end plate tends to be drawn back into the lower mixing section by the action of the screw fight blades 9 as shown by broken flow direction lines in FIG. 4.

The section of drum 1 above baffle 20 acts as a clarifying section and indeed as a multiple stage clarifying section. Cement solids settling within the canister can drain back along the cylindrical wall 27 of the canister and fall back into the lower mixing section through the gap between the canister and baffle 20. Any remaining cement solids settling between canister end wall 25 and baffle 40 or between baffle 40 and end plate 3 drain back along the wall of drum 1 back into the lower mixing chamber and this action is encouraged by the circulatory flow established by spiral blades 9. Concentrated slurry is kept uniformly distributed within the lower section by spiral blades 9 but additional agitation blades may be employed in the lower section if desired.

It will be apparent that baffle 20 could be attached to canister 23 and act as a lower end wall of canister 23 and in that event, apertures could be provided through the periphery of baffle 20 or through the periphery of canister side wall 24 near to its connection with baffle 20. It will also be apparent that canister 23 and/or baffles 20 and 40 may be supported by additional brackets from the drum wall if desired. Other multiple stage clarifiers could be used in the upper section for example, a second similar canister arrangement could surround baffle 40 being spaced apart from the canister end wall 25 or could be attached to the end wall of canister 25 with apertures being provided at the periphery. In other embodiments the baffles and canister constituting the clarifying section may be fixed to a non-rotating cantilevered shaft and be detached from the revolving drum and need not rotate with drum 1.

In the case of either the embodiments described, the concentrated slurry may be withdrawn from the lower mixing section and pumped in measured quantities to a concrete batch plant to be added to new batches of concrete being produced.

Figure 5:
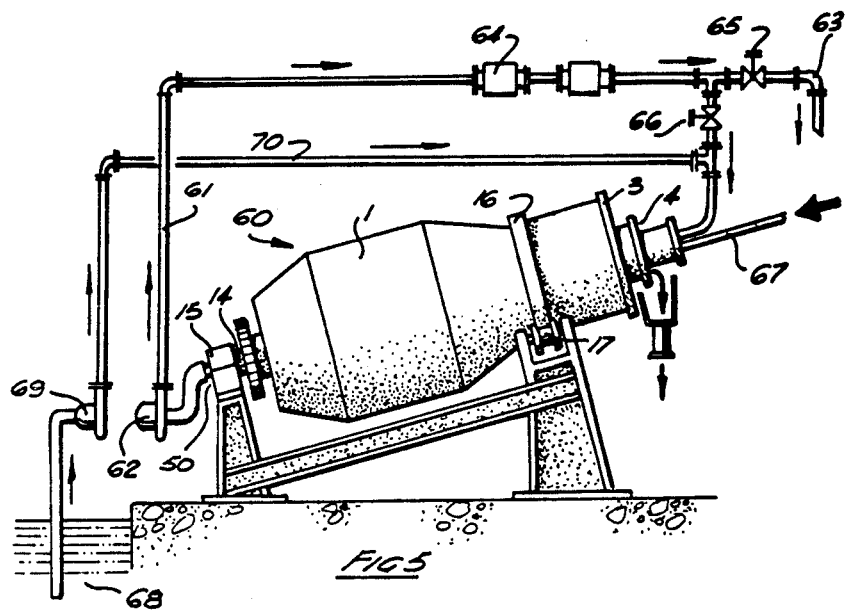
FIG. 5 shows diagrammatically a pumping system for delivery of concentrated slurry from apparatus according to the invention to a concrete mixing plant.

With reference to FIG. 5; apparatus according to the invention, indicated generally at 60, has a pipe 61 for withdrawing concentrated cement slurry which, by means of a pump at 62, may be transferred to a concrete mixing plant (not shown) via pipe 63.

Density measuring apparatus at 64 in combination with an interval timer are used to control valves 65 and 66 to adjust the proportion of concentrated cement slurry delivered to the mixing plant and the amount recycled to apparatus 60.

Diluted concrete slurry to be concentrated may be fed to apparatus 60 from an aggretate reclamation apparatus (not shown) via infeed pipe 67 or from a slurry pit indicated generally at 68 by means of pump 69 and pipe 70.

One example of the apparatus is capable of keeping in suspension under continuous agitation up to 5,000 kgs. of slurry solids mixed with about 5,320 liters of water. 5,800 kgs. of slurry is approximately equivalent to the cement in about 20 cubic meters of waste concrete typically collected from a day's operation at a cement mix plant. However the size of the apparatus may be increased or decreased as desired. Typically the apparatus of the example holds 7.64 cubic meters of water to the overflow point with a drum angle 15 degrees. Under typical operating conditions a concentrated liquid slurry at around 52% by weight of cement solids is produced from an infed slurry varying in solids content down to as low as about 5% and is kept in continuous agitation on a 24 hour per day basis.

The solid content and hence the density of the concentrated slurry varies depending on the solid content and quantity of infeed slurry.

The concentrated slurry solids are disposed of by mixing with the concrete in proportions of 0.1% to 5% by weight of new concrete. However the preferred range is from 1 to 3% by weight. The upper limit of amount which may be mixed with fresh concrete depends on levels specified as acceptable for the new concrete. Concentrated slurry is pumped from the apparatus to a mixing and truck charging point where it is mixed with new concrete. Usually it is desired to mix as much concentrated cement slurry as possible from the apparatus with new concrete and this is limited only by the percentage acceptable in relation to the specification for the new concrete. However the more highly concentrated the concentrated slurry, the less quantity of slurry can be mixed and vice versa. The quantity mixed may be controlled by a density measuring device and a flow timer. The density measuring device enables an operator to vary the quantity of slurry per cubic meter by simply increasing or decreasing the time interval which controls an outlet valve on a circulting line. This interval timer is preferably suitably graduated to simplify control for varying concrete volumes and slurry densities.

Provided the total cement solid of the waste cement slurry available does not, as an average, exceed the total cement solids of the concentrated slurry recycled into fresh concrete, then the apparatus enables 100 per cent of the slurry solids to be recycled as they are being generated. Surplus slurry, if any, may be collected in a pit or pumped into a container if necessary.

I claim:

1. A method for disposing of cement solids from a slurry of cement in water when said cement has been a component of an unset concrete comprising the steps of:
   separating some of the water from said slurry to produce a more concentrated slurry;
   agitating said concentrated slurry to keep it as a dispersion; and
   mixing said concentrated slurry with newly produced concrete in the proportion such that the weight of concentrated slurry solids is from 0.1% to 5% of the weight of cement in the total concrete produced.

2. A method according to claim 1 wherein the weight of slurry solids is from 1% to 3% of the weight of the cement contained in the total concrete produced.

3. A method according to claim 1 or claim 2 wherein said concentrated slurry has a cement solids content of greater than 40% by weight of said slurry.

4. A method according to claim 1 or claim 2 wherein said concentrated slurry has a cement solids content of greater than 50% by weight of said slurry.

5. A method according to claim 1 or claim 2 wherein the first and second steps thereof are performed by means of apparatus comprising
   an inclinded drum with a closed lower end and having water outlet means at its upper end;
   rotation means to rotate said drum about its axis;
   apertured baffled means defining in said drum a lower mixing section and at least one upper clarifying section;
   delivery means whereby a slurry to be concentrated may be deposited in said mixing section and withdrawal means whereby concentrated slurry may be withdrawn from said mixing section;
   said mixing section having fixed to the interior drum wall thereof at least one screw flight arranged with respect to the direction of rotation of said drum to urge solids settling in said mixing section towards the lower end thereof;
   said clarifying section having means for permitting the outflow of supernatant water from said outlet means; and
   means for returning solids settling in the clarifying section to said mixing section.

6. Apparatus for separating some of the water from a slurry of cement in water to produce a more concentrated slurry while maintaining said concentrated slurry as a dispersion, comprising
   an inclined drum with a closed lower end and having water outlet means at its upper end;
   rotation means to rotate said drum about its axis;
   apertured baffled means defining in said drum a lower mixing section and at least one upper clarifying section;
   delivery means whereby a slurry to be concentrated may be deposited in said mixing section and withdrawal means whereby concentrated slurry may be withdrawn from said mixing section;
   said mixing section having fixed to the interior drum wall thereof at least one screw flight arranged with respect to the direction of rotation of said drum to urge solids settling in said mixing section towards the lower end thereof;
   said clarifying section having means for permitting the outflow of supernetent water from said outlet means; and
   means for returning solids settling in the clarifying section to said mixing section.

7. An apparatus according to claim 6 wherein said clarifying section includes a plurality of baffle plates mounted in a plane substantially perpendicular to the axis of said drum each provided with an aperture or apertures permitting fluid flow past or through said baffle or baffles towards the upper end of said drum.

8. An apparatus according to claim 6 or claim 7 wherein said means for returning solids include an inclined surface against which said solids may settle and draining apertures between said baffle or baffles and said inclinded surface through which said solids may drain.

9. An apparatus according to claim 6 or claim 7 wherein said means for returning solids from said clarifying section to said mixing section is assisted by a flow of fluid induced near the wall of and towards the lower end of said drum by means of said screw flight rotation.

* * * * *

UNITED STATES PATENT AND TRADEMARK OFFICE
CERTIFICATE OF CORRECTION

PATENT NO. : 4,192,745

DATED : March 11, 1980

INVENTOR(S) : Maxwell G. Hood

It is certified that error appears in the above-identified patent and that said Letters Patent are hereby corrected as shown below:

Col. 4, line 48, change "5,000" to --5,800--.

Signed and Sealed this

Twenty-second Day of July 1980

[SEAL]

Attest:

SIDNEY A. DIAMOND

Attesting Officer

Commissioner of Patents and Trademarks